July 7, 1953 — P. P. GERACI — 2,644,648
FREE COIL LINE WINDER
Filed Dec. 11, 1950
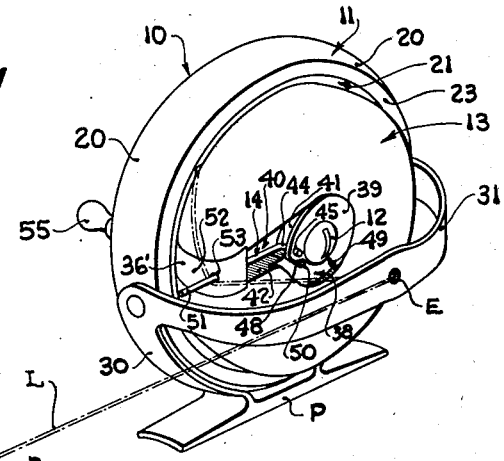
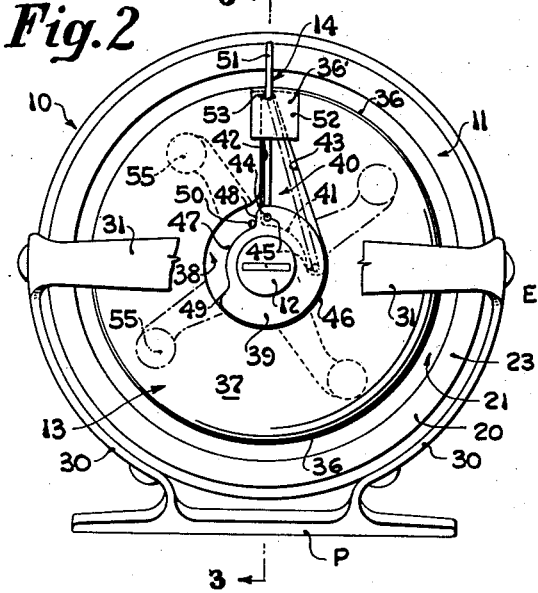
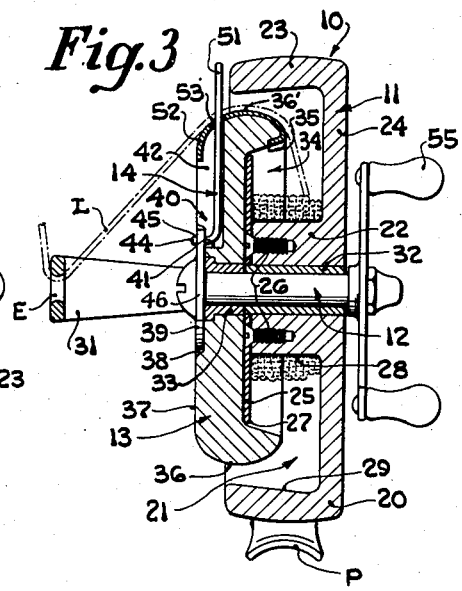
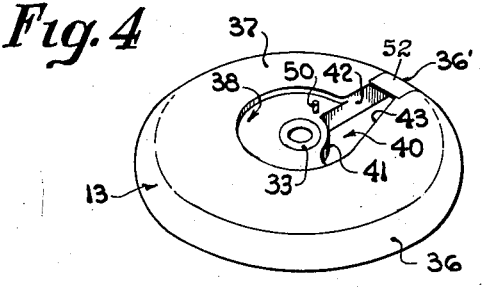
INVENTOR:
Peter P. Geraci
BY
Leslie M. Hansen
HIS ATTORNEY.

Patented July 7, 1953

2,644,648

UNITED STATES PATENT OFFICE 2,644,648

FREE COIL LINE WINDER

Peter P. Geraci, San Jose, Calif.

Application December 11, 1950, Serial No. 200,252

4 Claims. (Cl. 242—84.1)

This invention relates to free coil line winders and more particularly to a device for winding in and paying out fishing line or the like.

One object of this invention is to provide a line winder which is simple in construction, economical from the standpoint of cost of manufacture, and highly efficient in use.

Another object of this invention is to provide a retractable line winding arm for rotation adjacent a spool for winding a line onto the spool or for releasing the line for unwinding from the spool.

Another object is to provide a line guiding wheel having a recess configurated to house the retractable line winding arm so as to be actuated thereby only when the arm is in its extended or line winding position.

Another object is to provide a simple stationary spool axially supporting a crank operated shaft connected eccentrically to an extendable arm guided in a wheel floatingly mounted on said shaft.

These and other objects and advantages of the present invention will become apparent in the following description in view of the drawings in which:

Figure 1 is a perspective view of a fish line winder as seen from the front and line feeding side and with parts shown in line winding position.

Figure 2 is a side elevational view of the line winder shown in Figure 1 with parts thereof broken away and other parts shown in phantom for purposes of illustration.

Figure 3 is a vertical cross section of the line winder as shown in Figure 2 and taken along line 3—3 thereof.

Figure 4 is a perspective view of a portion of the line winder structure shown in Figures 1, 2 and 3.

The present invention is shown embodied in a fish line winder generally designated 10 in the drawings and comprising, in general, a stationary spool 11 supporting a crank shaft 12 in turn supporting a floating wheel 13 having operative connection with the shaft 12 by a retractable arm 14.

The stationary spool 11 is of a unitary construction consisting of a main body 20 which may be wood, metal, plastic or any such suitable material. The body 20 is of a predetermined diameter and thickness to suit the purposes later to be made apparent. This body 20 has an annular recess 21 so formed in it as to be bounded by a hub 22 and an outer or peripheral wall 23 connected by a disc-like side wall 24 of the body 20. In the present disclosure a relatively thin disc like side wall 25 is shown secured by screws 26 to the hub 22 on the opposite end of the hub relative to the side wall 24, it being understood, however, that this disc 25 can be formed integrally with the rest of the body 20, if desired.

The disc-like wall 25 is of such diameter that its periphery 27 will be disposed substantially midway between the periphery of the hub 22 and the inner peripheral surface 29 of the outer wall 23 of the body 20. Thus the disc walls 24 and 25 cooperate with the hub 22 in forming the spool 11 hereinbefore referred to. The hub 22 serves to receive one end of a fishline L which is suitably secured to the hub so as to be wound upon it. The body 20 is secured to a band 30 which fits sngly against the periphery of body 20 and has a pedestal P formed between the ends of the band 30. This pedestal is of common construction for mounting on a fishing pole or rod in the conventional manner. A bowlike bracket 31 extends from the ends of the bracket 30 in a diametrical plane forwardly of the recessed side of the body 20. This bow bracket 31 has an eyelet E formed therein concentric to the axis of the body 20 to form a guide for the line L extending from the spool 11.

The hub 22 has a sleeve bushing 32 secured axially thereof to receive and support the aforementioned shaft 12 for rotation. The wheel 13 is also provided with a sleeve bushing 33 which is press-fit concentrically of the wheel for mounting the latter on the shaft 12 for rotation.

The wheel 13 is of substantial width and is recessed as at 34 on its inner side 35 to fit over the disc wall 25. The depth of the recess 34 is such as to dispose the inner side 35 of the wheel 13 approximately one half the distance between the inner faces of the disc walls 24 and 25. Thus the line extending from the hub 22 feeds easily from side to side of the spool 11. The periphery 36 of the wheel 13 is of ovoid contour in a crosswise direction. This serves to assure smooth movement of the line L to and from the spool 11 to thereby minimize fouling of the line L.

The outer side 37 of wheel 13 is provided with a concentric annular recess 38 forming a seat for receiving a flange 39 formed on the outer end of the shaft 12. To the rear, i. e., inwardly, of the flange 39, the wheel 13 is further provided with a deep recess or pocket 40 having an arcuate margin 41 adjacent the axis of the wheel and of lesser radius than the annular recess 38 or the flange 39 with respect to the axis of rotation of the wheel 13. This pocket 40 also has one wall 42 extending substantially radially of the wheel and another wall 43 extending tangentially from the annular recess 38 toward the region of intersection of wall 42 with the periphery 36 of the wheel 13. The two walls 42 and 43 do not merge at the periphery 36 but are spaced from each other to form an open end in the pocket 40 at the periphery 36 of the wheel.

The retractable arm 14, previously mentioned, is disposed within the pocket 40 and has one of its ends 44 pivotally connected as at 45 to the flange 39 eccentrically of the axis of rotation of the latter. The flange 39 overlies that portion of the pocket 40 bounded by the arcuate margin 41 of the latter to allow for the pivotal connection 45 and arcuate movement of the end 44 of the arm 14 relative to the wheel 13.

The periphery 46 of the flange 39 is preferably recessed as at 47 to provide radially disposed shoulders 48 and 49 which cooperate with a pin 50 extending from the floor of recess 38 to limit turning movement of the flange and shaft 12 relative to the wheel 13. This provides sufficient lost motion between the shaft 12 and wheel 13 to effect movement of the arm 14 between extended and retracted position relative to the wheel 13. When the arm 14 is in extended position as shown in Fig. 2 it engages the front wall 42 of recess 40 to effect turning of the wheel 13.

In connection with the foregoing it will be noted that the retractable arm 14 is of such a length that its free end 51 will extend beyond the inner peripheral surface 29 of the wall 23 when the arm 14 is substantially radially disposed relative to the wheel 13. Thus the free end 51 of the arm 14 causes the line L to be wound onto the hub 22. However, when the flange 39 is swung clockwise (Fig. 2) relative to the wheel 13 the entire length of the arm 14 is confined within the pocket 40 as shown by dot-dash lines in Fig. 2. In this latter position of the arm 14 its free end 51 is retracted internally of the periphery 36 of the wheel 13 so that the line L is free to be unwound from the hub 22.

A metal plate 52, having an outer surface 36' configurated identically with the ovoid periphery 36 of the wheel 13, is inlaid into the body of the wheel 13 in the region of the open end of the pocket 40. The plate 52 bridges the gap between the pocket walls 42—43 and is provided with a passage 53 forming a guide for the free end of the retractable arm 14.

A crank 55 is secured to the shaft 12 adjacent the outer side of the disc wall 25 of the body 20. Consequently, when the crank 55 is turned (counterclockwise, Fig. 2, clockwise, Fig. 3) the shaft 12 turns the flange 39 and pivotal connection 45 thereof with the arm 14 until the arm is disposed with its free end 51 extended radially of the wheel 13. Continued movement of the crank counterclockwise, Fig. 2, in the manner just explained effects turning of the wheel 13 with the shaft 12. Consequently, the extended end 51 of the arm 14 bears against one side of the line L to wind the line around the stationary spool 11.

The inlaid metal plate 52 provides a wear resistant surface 36' around the point of extension of the arm 14 and assures smooth travel of the line over the ovoid periphery of the wheel 13. In this manner the line L is wound upon the relatively stationary hub between the sides of the spool 11. Since the inner margin of the ovoid periphery 36 at face 35 lies between the spool walls 24—25 the line L will readily follow each convolution forth and back across the spool during winding of the line around the hub. In the same manner the line L will pay out from the spool 11 when the arm 14 is retracted and a bait or weight (not shown) at the end of line L is cast in the usual manner.

In connection with the foregoing it will be noted that as the line L pays out from the spool 11 it travels over and slides circumferentially around the ovoid periphery 36 of the wheel 13. The wheel 13 and spool 11 remain stationary during unwinding of the line. Since the line L is guided through the eyelet E which is concentric to the spool and wheel, it will be apparent that a uniform action of the line takes place at any one point around the periphery of the wheel.

While I have described my new free coil line winder in specific detail it will be apparent that the same may be modified, altered or varied without departing from the spirit of my invention. I therefore desire to avail myself of all modifications, alterations and variations as fairly come within the purview of the appended claims.

What I claim as new and desire to protect by Letters Patent is:

1. A line winder comprising a stationary spool adapted to have one end of a line secured thereto, a shaft mounted for rotation concentrically of said spool, a crank on one end of said shaft adjacent one side wall of said spool, a bracket extending from said stationary spool provided with an eyelet concentrically of said spool in spaced relation to the other side wall thereof, a wheel mounted for rotation on the other end of said shaft and having a periphery formed to provide an ovoid guide surface for the line extending from said spool through the eyelet in said bracket, a flange secured to said other end of said shaft for retaining said wheel adjacent said other side wall of said spool, the outer face of said wheel having a recess formed therein bordered by an arcuate wall of lesser radius than that of the periphery of said flange, a front wall disposed substantially radially relative to said wheel and a rear wall extending from the rear extremity of said arcuate wall toward the periphery of said wheel in the region of intersection of the latter with the front wall of said recess to form a gap opening onto the periphery of said wheel, a guide plate embedded in the periphery of said wheel configurated to conform to the ovoid guide surface thereon over the gap formed by the front and rear walls of said recess and having a guide passage communicating with the recess, and an arm disposed in said recess having one of its ends pivotally connected to said flange adjacent the periphery of said flange and its opposite end arranged within the guide passage in said guide plate, said arm being of a length such as to be wholly confined within said recess when disposed adjacent the rear wall thereof and to have its free end extend from the periphery of said wheel when said crank is turned to dispose said arm adjacent the front wall of the recess formed in the outer face of said wheel for coiling said line around said spool.

2. A line winder comprising a stationary spool having one end of a line secured thereto, a shaft mounted for rotation axially of said spool, a crank on said shaft adjacent one side wall of said spool, a bracket extending from said spool into spaced relation to the other side wall thereof provided with an eyelet concentrically of said shaft, a wheel mounted for rotation on the other end of said shaft having an ovoid periphery for guiding the line extending from said spool through the eyelet in said bracket, said wheel having a central recess in its inner face for receiving said other side wall of said spool to dispose the inner face of said wheel between the side walls of said spool for guiding the line radially therefrom, a flange secured to said other end of said shaft for retaining said wheel adjacent said other side wall of said spool, said wheel having a recess in its outer face bordered by an arcuate wall of lesser radius from said shaft than the periphery of said flange, a front wall substantially radially disposed relative to said shaft and a rear wall extending from the rear extremity of said arcuate wall toward the periphery of said wheel in the region of intersection of the latter with the front wall of said recess to form a gap at the periphery of said wheel, a guide plate embedded in the periphery of said wheel conforming to the ovoid surface of the latter, said guide plate having a passage opening communicating with the gap formed by said recess, and an arm disposed in said recess having one of its ends pivotally connected to said flange adjacent the periphery of said flange and its opposite end guided within the passage opening formed in said guide plate, said arm being of a length such as to be wholly confined within said recess when disposed adjacent the rear wall thereof and to extend from the periphery of said wheel when said crank is turned to dispose said arm adjacent the front wall of said recess to thereby engage the latter to effect turning of said wheel during engagement of the line by the extended end of said arm and coiling of said line around said spool.

3. A line winder comprising a stationary spool having a line wound thereon, a shaft mounted for rotation concentrically of said spool, means on one end of said shaft adjacent one side wall of said spool for turning said shaft, a bracket extending from said spool in the direction of the opposite side wall thereof and having an eyelet concentrically of said spool in spaced relation to said opposite side wall thereof, a wheel mounted for rotation on the other end of said shaft in the region of said opposite side wall of said spool and having an ovoid guide surface for the line extending from said spool through the eyelet in said bracket, a flange secured to said other end of said shaft for retaining said wheel adjacent said opposite wall of said spool, the outer face of said wheel having a recess formed therein bordered by an arcuate wall adjacent said shaft of lesser radius than that of the periphery of said flange, a front wall disposed substantially radially relative to said wheel and a rear wall extending from the rear extremity of said arcuate wall toward the periphery of said wheel in the region of intersection of the latter with the front wall of said recess to form a passage through the periphery of said wheel, and an arm disposed in said recess having one of its ends pivotally connected to said flange between the periphery thereof and the arcuate wall of said recess, said arm having its opposite end arranged within the passage formed through the periphery of said wheel and being of a length such as to be wholly confined within said recess when disposed adjacent the rear wall thereof and to have its free end extended from the periphery of said wheel when said shaft is turned to dispose said arm in abutment with the front wall of said recess for turning said wheel with said shaft whereby the end of said arm extended from the periphery of said wheel effects coiling of said line around said stationary spool during turning of said wheel.

4. A line winder comprising a stationary spool having a line wound thereon, a crank shaft mounted for rotation concentrically of said spool, means on one end of said crank shaft adjacent one side wall of said spool for turning said crank shaft, a guide wheel mounted for rotation on the other end of said shaft, a bowed bracket extending from that side wall of said stationary spool which is remote from and opposite the side thereof adjacent said crank, said bracket extending into spaced relation relative to said opposite side wall of said spool and having a grommet opening for receiving one end of the line wound on said spool, a flange secured to said crank shaft for retaining said wheel adjacent said opposite side wall of said spool in spaced relation to the grommet opening in said bracket to thereby guide said line from the spool through the opening in said bracket, the outer face of said wheel having a recess formed therein bordered by a front wall disposed radially of said wheel, an arcuate wall a lesser radial distance from the axis of said shaft than the outer periphery of said flange, and a rear wall extending from the rearmost extremity of said arcuate wall to the periphery of said wheel to form a gap at the periphery of said wheel, a guide plate embedded in the periphery of said wheel over the gap therein and having a guide passage communicating with said recess, and an arm disposed in said recess having one of its ends pivotally connected to said flange between the periphery of said flange and the arcuate wall of said recess, said arm having its opposite or free end arranged in retracted position within the guide passage in said guide plate when said crank shaft is turned in one direction to free said line for uncoiling from said spool, said arm being adapted, when said crank shaft is turned in an opposite direction, to engage the front wall of said recess for turning said wheel with said shaft and for extending the free end of said arm from the periphery of said wheel to effect winding of said line onto said spool.

PETER P. GERACI.

References Cited in the file of this patent

UNITED STATES PATENTS

| Number | Name | Date |
| --- | --- | --- |
| 2,492,587 | Ledingham | Dec. 27, 1949 |
| 2,521,543 | Shakespeare et al. | Sept. 5, 1950 |